J. M. ROE.
PORTABLE STOVE.
APPLICATION FILED APR. 1, 1912.
1,042,273.
Patented Oct. 22, 1912.
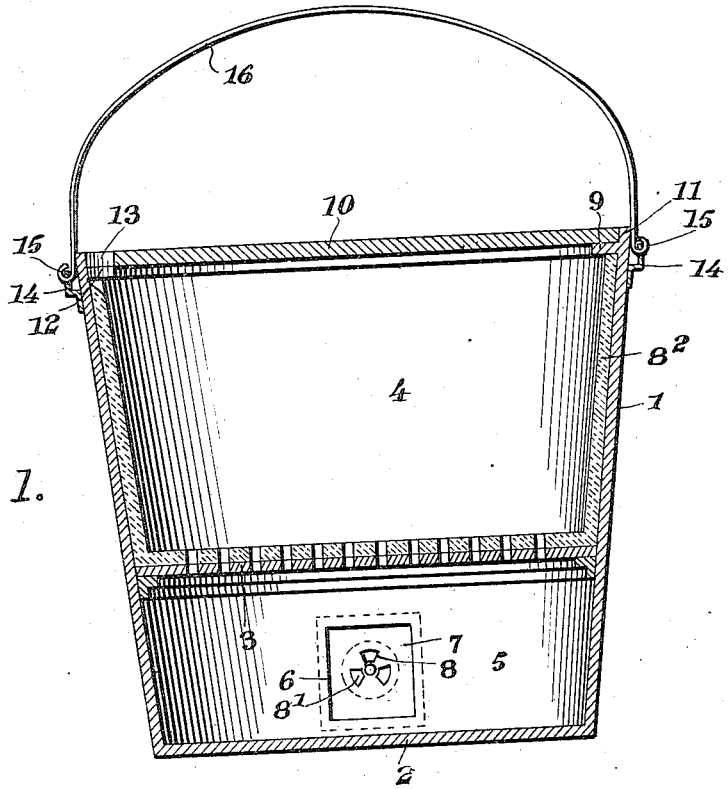
Fig. 1.
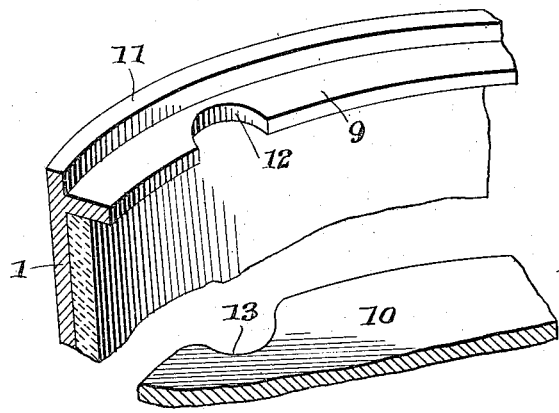
Fig. 2.
Fig. 3.
Inventor
J. M. Roe
By Victor J. Evans
Attorney
Witnesses

UNITED STATES PATENT OFFICE.

JACKSON M. ROE, OF SUNNYSIDE, WASHINGTON, ASSIGNOR OF ONE-HALF TO ORIN W. CRIDER, OF SUNNYSIDE, WASHINGTON.

PORTABLE STOVE.

1,042,273.  Specification of Letters Patent.  Patented Oct. 22, 1912.

Application filed April 1, 1912. Serial No. 687,751.

*To all whom it may concern:*

Be it known that I, JACKSON M. ROE, a citizen of the United States and State of Washington, residing at Sunnyside, in the county of Yakima and State of Washington, have invented new and useful Improvements in Portable Stoves, of which the following is a specification.

This invention relates to portable stoves and has for an object to provide a device of this character which will be simple in construction, inexpensive to manufacture and capable of being operated with a minimum amount of fuel.

Another object of the invention is to provide a stove which will be provided with a lid support and an adjustable lid which are coöperatively associated and so constructed as to form a damper which is capable of operation to regulate the draft of the stove.

In the drawing forming a portion of this application, and in which like letters of reference indicate similar parts in the several views:—Figure 1 is a vertical section through the stove. Fig. 2 is a sectional perspective view of a portion of the stove. Fig. 3 is a sectional perspective view of a portion of the lid.

The stove as designed herein is extremely desirable for use in rural districts or the like and is also admirably adapted for camping purposes and in view thereof the stove preferably comprises a bucket like receptacle 1 which is provided with a bottom 2 and a foraminous portion 3, the latter being adapted to form a grate and as illustrated it is so arranged in the receptacle as to divide the latter into an upper fire pot 4 and a lower ash pit 5. The walls of the ash pit portion of the receptacle are provided with an opening 6 which is covered by a door 7. This door has suitable damper openings 8' therein over which a movable damper 8 is adapted to be adjusted with a view to regulating the draft. The walls of the fire pot portion of the receptacle are coated therewithin with cement or the like as shown at 8².

At the upper end the receptacle 1 is provided with an inwardly extending annular horizontal flange 9 which rotatably supports a lid 10. A portion 11 of the receptacle 1 is disposed above the plane of the flange 9 so as to embrace the lid 10 and to guard against accidental displacement of the same from the receptacle. The flange 9 is provided with one or more recesses 12 which are adapted to register with similar recesses 13 in the lid. From this construction it is evident that the lid and the flange combine to produce a damper at the top of the receptacle which will admirably assist the lower damper in furnishing the stove with a suitable draft. Charcoal or the like may be burned in the fire pot 4 and the lid 10 will be exposed to the full action of the heat so that irons, cooking utensils or the like can be rapidly heated. The receptacle 1 is provided with suitable ears 14 which receive the eyes 15 of a carrying bail 16.

I claim:—

1. A stove provided with a fire pot and an ash pit, a grate separating the former from the latter, a damper in the bottom of the stove, a recessed flange formed on the stove, and an adjustable lid supported on the flange and provided with recesses therein adapted to wholly or partly register with the recesses of the flange on the adjustment of the lid.

2. A stove comprising a receptacle having an ash pit and a fire pot, a damper located in the receptacle below the fire pot, a flange carried by the receptacle and extending from the fire pot thereof and provided with recesses therein at spaced intervals, a lid revolubly mounted on the flange and detachably connected therewith and provided with peripheral recesses adapted to partly or wholly register with the recesses of the flange, and a guard on the walls of the receptacle, the said guard being arranged in embracing relation with the lid and serving to hold the latter against displacement from the receptacle.

In testimony whereof I affix my signature in presence of two witnesses.

JACKSON M. ROE.

Witnesses:
W. A. FUNK,
H. A. BOOSE.

Copies of this patent may be obtained for five cents each, by addressing the "Commissioner of Patents Washington, D. C."